United States Patent
Kim et al.

(10) Patent No.: US 8,995,909 B2
(45) Date of Patent: Mar. 31, 2015

(54) METHOD AND APPARATUS FOR OBTAINING AND PROCESSING LOCATION INFORMATION WITH NEAR FIELD COMMUNICATION

(71) Applicant: Electronics and Telecommunications Research Institute, Daejeon (KR)

(72) Inventors: Sang Wan Kim, Daejeon (KR); Joon Kyung Lee, Daejeon (KR); Dong Won Kang, Daejeon (KR); Jong Dae Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 162 days.

(21) Appl. No.: 13/683,352

(22) Filed: Nov. 21, 2012

(65) Prior Publication Data
US 2013/0149962 A1  Jun. 13, 2013

(30) Foreign Application Priority Data
Nov. 22, 2011 (KR) .................. 10-2011-0122485

(51) Int. Cl.
*H04B 5/00* (2006.01)

(52) U.S. Cl.
CPC ............ *H04B 5/0025* (2013.01); *H04B 5/0031* (2013.01); *H04B 5/0056* (2013.01)

USPC ................. 455/41.1; 455/41.2; 455/456.1

(58) Field of Classification Search
CPC ........................................ H04W 64/00
USPC ............... 455/41.1, 41.2, 456.1, 456.2
See application file for complete search history.

(56) References Cited

U.S. PATENT DOCUMENTS

2013/0020389 A1* 1/2013 Barnett ................ 235/380

FOREIGN PATENT DOCUMENTS

| JP | 2005032155 A | 2/2005 |
| JP | 2005346587 A | 12/2005 |
| KR | 1020090061898 A | 6/2009 |
| KR | 1020100027755 A | 3/2010 |
| KR | 1020100047360 A | 5/2010 |

* cited by examiner

*Primary Examiner* — Tuan H Nguyen
(74) *Attorney, Agent, or Firm* — William Park & Associates Patent Ltd.

(57) ABSTRACT

In an environment in which tag readers are installed at a plurality of locations, communication between a tag reader and a terminal including a near field communication (NFC) tag capable of bi-communication with a tag reader is triggered. The tag reader transmits user information and location information which was provided to the terminal to a location information management server so that a service based on the information is provided.

11 Claims, 3 Drawing Sheets

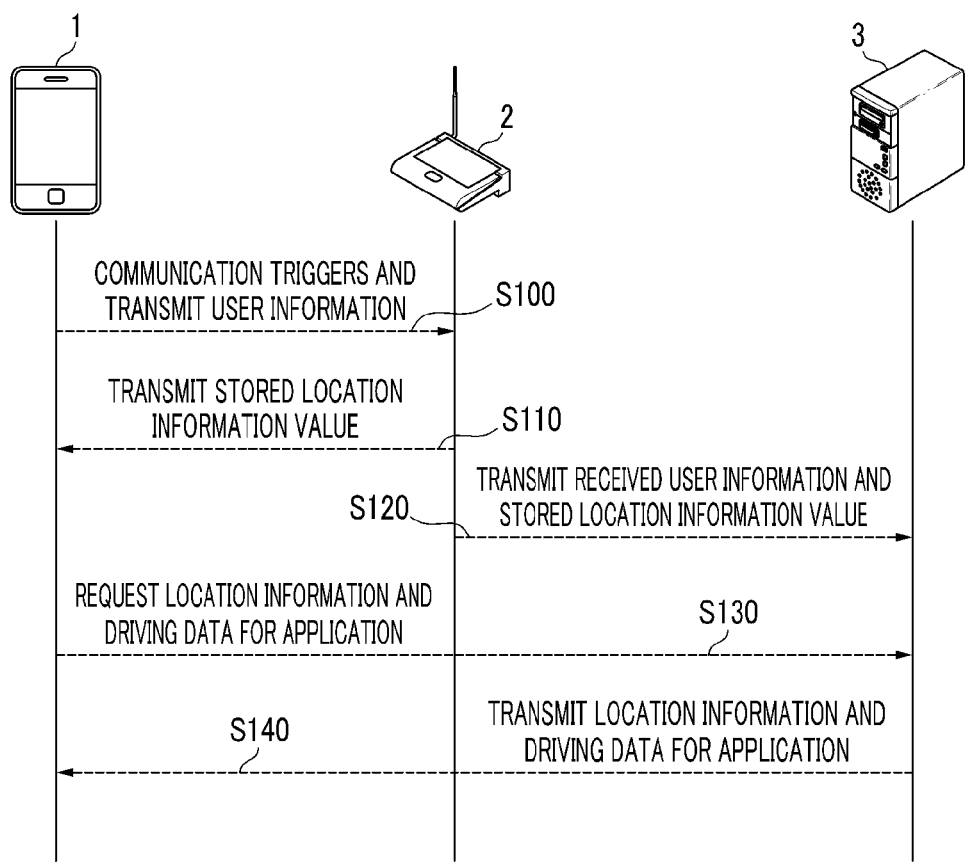

METHOD AND APPARATUS FOR OBTAINING AND PROCESSING LOCATION INFORMATION WITH NEAR FIELD COMMUNICATION

CROSS-REFERENCE TO RELATED APPLICATION

This application claims priority to and the benefit of Korean Patent Application No. 10-2011-0122485 filed in the Korean Intellectual Property Office on Nov. 22, 2011, the entire contents of which are incorporated herein by reference.

BACKGROUND OF THE INVENTION (a) Field of the Invention

The present invention relates to a method and apparatus for obtaining and processing location information. More particularly, the present invention relates to a method and apparatus for obtaining and processing location information with near field communication.

(b) Description of the Related Art

Recently, to obtain a location of a terminal, a method for using a location information value provided from a global positioning system (GPS), a method for indirectly obtaining a location of a terminal based on cell location information of a base station, and others have been used.

The method for using a location information value provided from a GPS can provide accurate location information, but it is not able to obtain a location in an area in which the GPS cannot provide location information such as a basement floor.

The method for indirectly obtaining a location of a terminal obtains location information on the terminal based on cell location information of a base station with a triangulation method. The range of the location information obtained by the method extends to several kilometers from several hundred meters, and thereby it is difficult to provide accurate location information.

Therefore, a method for obtaining more accurate location information is needed.

SUMMARY OF THE INVENTION

The present invention has been made in an effort to provide a method and apparatus for obtaining and processing location information with near field communication (NFC).

An exemplary embodiment of the present invention provides a method for obtaining and processing location information. The method includes: communication between a terminal including a near field communication (NFC) tag and a tag reader in an environment in which tag readers are installed at a plurality of locations; the tag reader being provided with user information from the terminal; the tag reader providing stored location information to the terminal; and the tag reader providing the user information and the location information provided to the terminal to a location information management server.

The method may further include: the location information management server receiving the user information and the location information from the tag reader and storing and managing them; and the location information management server providing an application service based on the user information and the location information.

The method may further include: the location information management server receiving user information from the terminal; and the location information management server obtaining location information corresponding to the user information received from the terminal, wherein, in the location information management server providing an application service, the location information management server may provide an application service based on the obtained location information to the terminal.

The method may further include: the location information management server receiving a data request signal including user information from the terminal; the location information management server obtaining location information corresponding to the user information included in the data request signal from the stored and managed information; and the location information management server transmitting the obtained location information and response data to the terminal.

The method may further include: the terminal receiving the response data and the location information from the location information management server; the terminal executing an application unit according to the response data; and the terminal being provided with an application-related service from the location information management server through the executed application unit.

The method may further include: the terminal providing the user information to the tag reader; the terminal receiving location information from the tag reader; and the terminal using the location information which is received from the tag reader as its location information.

Another embodiment of the present invention provides a tag reader. The tag reader includes: a first communication unit for transmitting/receiving to/from a terminal including a near field communication (NFC) tag; a second communication unit for transmitting/receiving to/from a location information management server; an information storage unit for location information on a location at which a tag reader is installed; and an information providing unit for providing the location information stored in the information storage unit to the terminal through the first communication unit, wherein the information providing unit provides the user information and the location information provided to the terminal to the location information management server.

The location information stored in the information storage unit may be one among information input by a user for managing a place at which the tag reader is installed, information input through an additional terminal, and information provided from a server for providing location information.

Yet another embodiment of the present invention provides a terminal. The terminal includes: a near field communication (NFC) tag for communicating with a tag reader in an environment in which tag readers are installed at a plurality of locations, providing user information to the tag reader, and receiving location information from the tag reader; and an application unit for providing data related to the location information by being executed based on response data provided from a location information management server.

The terminal may transmit a data request signal including the user information and then receive the response data and location information from the location information management server.

The application unit may be executed by the response data, and then process and output the application data based on the location information received from the location information management server.

BRIEF DESCRIPTION OF THE DRAWINGS

FIG. 3 shows a method for obtaining and processing location information with near field communication according to an exemplary embodiment of the present invention.

DETAILED DESCRIPTION OF THE EMBODIMENTS

Figure 1:
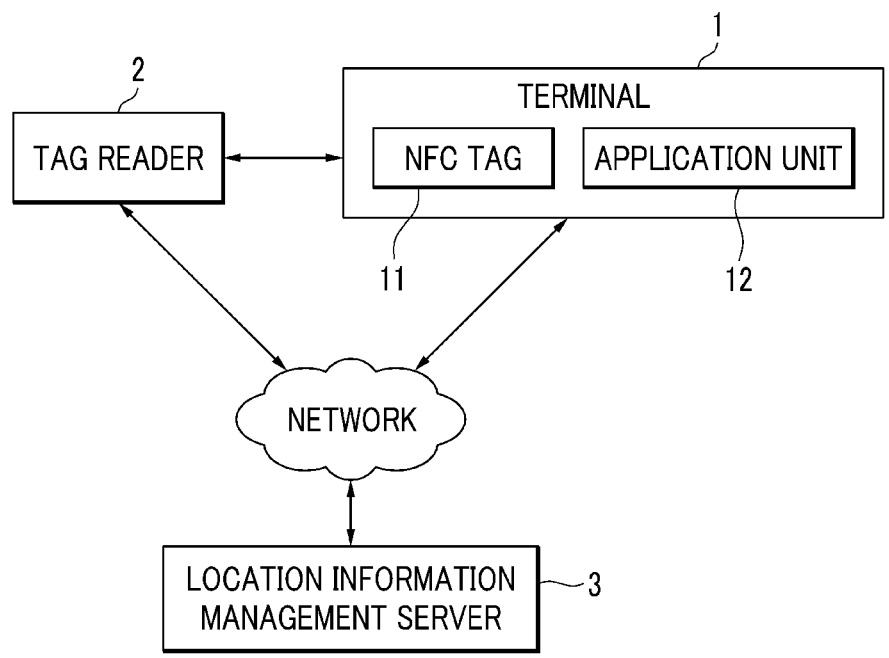
FIG. 1 shows a network environment according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, in addition, unless explicitly described to the contrary, the word "comprise" and variations such as "comprises" or "comprising" will be understood to imply the inclusion of stated elements but not the exclusion of any other elements.

In this specification, a terminal may refer to a mobile station (MS), a mobile terminal (MT), a subscriber station (SS), a portable subscriber station (PSS), user equipment (UE), or an access terminal (AT). The terminal may include all or part of the functions of the mobile station, the subscriber station, the portable subscriber station, and the user equipment.

Next, referring to the drawings, a method and apparatus for obtaining and processing location information with near field communication according to an exemplary embodiment of the present invention will be described FIG. 1 shows a network environment according to an exemplary embodiment of the present invention.

As shown in FIG. 1, a terminal 1 communicates with a tag reader 2 based on near field communication (NFC). The tag reader 2 communicates with a location information management server 3. In this network environment, a plurality of tag readers 2 are installed at a plurality of locations, respectively.

The terminal 1 includes a communication module for transmitting/receiving based on the NFC, that is, an NFC tag 11. The NFC tag 11 is capable of reading and writing data, unlike a radio frequency identification (RFID) tag. The structure of the NFC tag is known to a person of ordinary still in the art such that its detailed description will be omitted.

The tag reader 2 communicates with the terminal 1 based on the NFC.

Figure 2:
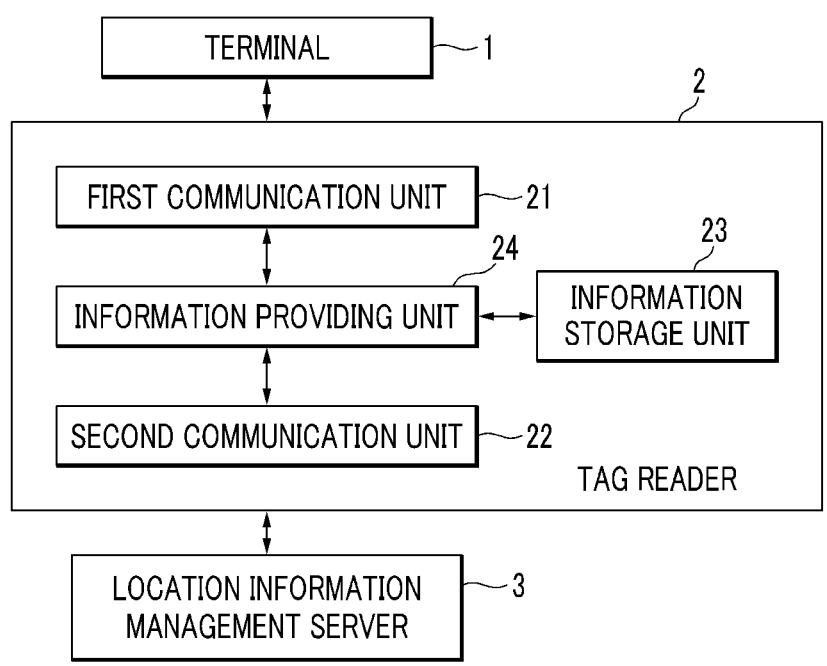
FIG. 2 shows a structure of a tag reader according to an exemplary embodiment of the present invention.

FIG. 2 shows a structure of a tag reader according to an exemplary embodiment of the present invention.

The tag reader 2 installed at a location, as shown in FIG. 2, includes a first communication unit 21 for transmitting/receiving a signal to/from the NFC tag 11, a second communication unit 22 for transmitting/receiving a signal to/from a location information management server 3, an information storage unit 23, and an information providing unit 24.

The first communication unit 21 transmits/receives a signal to/from the NFC tag 11 of the terminal 1 based on the NFC, and particularly, provides location information to the information storage unit 23.

The second communication unit 22 transmits/receives a signal to/from the location information management server 3, and provides information on a location at which the tag reader 2 is installed to the location information management server 3.

The information storage unit 23 stores and manages information on the location at which the tag reader 2 is installed. The location information on the tag reader may be later used as location information on a current location of the terminal 1. The location information of the tag reader may be information input by a manager for managing the area in which the tag reader is installed, information input to the tag reader through an additional terminal, or information provided from a server (not shown) for providing location information. The location information of the tag reader 2 according to an exemplary embodiment of the present invention may be obtained through various channels and methods and then be stored and managed in the information storage unit 23. The location information stored in the tag reader 2 will be referred to as "a location information value". The location information value is used for representing actual location information of the terminal 1.

The information providing unit 24 is provided with user information from the NFC tag 11 of the terminal 11, and provides the location information values stored in the information storage unit 23 to the NFC tag 11 of the terminal 1. The information storage unit 24 provides the user information from the NFC tag 11 of the terminal 1 and stored location information value to the location information management server 3 through the second communication unit 22.

The location information management server 3 communicating with the above tag reader 2 receives the user information and the location information value, and stores and manages them. Also, the location information management server 3 executes various applications using location information to provide the requested data.

The tag reader 2 obtains the user information from the terminal 1, searches corresponding location information among the stored and managed location information, and provides it to the terminal 1. The tag reader 2 provides the user information of the terminal 1 and the corresponding location information to the location information management server 3.

The location information management server 3 stores and manages the user information and a location information value from the tag reader 2. The location information management server 3 searches location information corresponding to a request from the terminal 1 among the stored and managed data, processes the request based on the searched location information, and provides the results of the processing to the terminal 1.

As shown above, the location information management server 3 may process the data (the user information and the location information value) and provide various application services.

Meanwhile, the terminal 1 further includes, as shown in FIG. 1, an application unit 12, in addition to the NFC tag 11. The application unit 12 requests the data for executing a corresponding application to the location information management server 3, and executes the corresponding application based on the response data provided from the location information management server 3. The executed application processes data related to the location information provided from the location information management server 3 and outputs it. Also, the application may provide a location-related service by processing location information provided from the tag reader 2.

In the exemplary embodiment of the present invention, the user information may include an identification number of the terminal, and may further include user-related information corresponding to authentication of a user of the terminal, for example, an ID, a password, and others. Here, the identification number of the terminal is used as the user information, but it is not restricted thereto.

The terminal 1 is able to communicate with the tag reader 2 within a close range. For example, the terminal may communicate with the tag reader 2 within 10 cm at 13.56 MHz.

Next, a method for obtaining and processing location information with near field communication according to an exemplary embodiment of the present invention will be described.

FIG. 3 shows a method for obtaining and processing location information with near field communication according to an exemplary embodiment of the present invention.

As shown in FIG. 3, when the terminal 1 including the NFC tag 11 approaches the tag reader 2 installed at a location, communication between the NFC tag 11 and the tag reader 2 is triggered. Accordingly, the transmitting/receiving between the NFC tag 11 and the tag reader 2 is made possibly. According to the triggering of the communication, the NFC tag 11 of the terminal 1 transmits user information to the tag reader 2 (S100).

The tag reader 2 receives the user information from the NFC tag 11 of the terminal 1 and transmits a location information value which is stored in the information storage unit 23 to the NFC tag 11 of the terminal 1 (S110). The NFC tag 11 of the terminal 1 stores the location information value transmitted from the tag reader 2 in a storage unit of the terminal. Therefore, the terminal 1 can confirm its location based on the location information value from the tag reader 2.

Meanwhile, the tag reader 2 transmits the user information obtained from the terminal 1 and the location information value provided to the terminal 1 to the location information management server 3 (S120). The information including the user information and the location information value is used later when requesting data for executing an application of the terminal 1.

The terminal 1 may request location information and application services using location information to the location information management server 3. For this purpose, the terminal 1 transmits the data request signal including user information to the location information management server 3 (S130). The location information management server 3 obtains location information of the terminal 1 based on the user information included in the signal received from the terminal 1, and transmits the location information and the response data to the terminal 1 (S140). Accordingly, the application unit 12 of the terminal 1 is activated based on the response data provided from the location information management server 3, and thus receives and processes application-related services from the location information management server 3. For example, the application unit 12 receives and processes application-related data based on the location information, and thus a user is provided with location-related services through the terminal 1.

Meanwhile, in the step S130, the terminal 1 may provide location information while providing the data request signal and the location information management server 3 provides location information corresponding to user information according to the request to the terminal 1 or provides additional information (e.g., the shortest distance to the destination) based on the location information provided from the terminal 1.

The method and apparatus for obtaining and processing location information with the near field communication according to the exemplary embodiment of the present invention may be applied to the cases below.

First, there are cases of photographing or storing a parking location with a terminal after parking since parking lots have become bigger. In the cases, the tag reader 2 according to the exemplary embodiment of the present invention may be installed at every parking block. A user may be provided with parting location information from the tag reader 2 installed at a parting block by using the terminal 1 including an NFC tag 11 when approaching the tag reader 2. After a lapse of time, the user may easily identify the parking location information from the terminal, and thus it is possible to reduce the possibility of confusing a parking location.

Secondly, in a case in which tag readers 2 are installed at various areas, such as a public institution, a shopping mall, a department store, a bank, a subway station, a bus, an entrance, and others, user information and location information is transmitted by the terminal 1 including an NFC tag 11 to the location information management server 3 to be managed. Accordingly, a user may identify accurate user location information through the location information management server even when standing inside the area. Particularly, the location information management server 3 utilizes the managed user information and location information in a criminal investigation such as a kidnapping or disappearance.

Thirdly, the location information management server 3 may store and manage the user information and location information to provide various application services related to location information to a user. For example, an application service for providing map information on a large place like a large shopping mall and a department store through the Web may be provided to a user. In this case, the location information management server 3 may provide a service for displaying a current location of the terminal 1 on a map after receiving the location of the terminal 1 from the tag reader 2. Also, it is possible to provide the shortest route from the current location of the terminal to the destination inside the large place and its location information on a map or to provide a Find Pals service inside the large place on a map, and thus various location-based services through the application service may be provided.

As shown above, according to the exemplary embodiment of the present invention, a terminal includes a tag capable of bi-directional communication with tag readers installed at a plurality of locations by near field communication. Therefore, the terminal can be provided with accurate location information from the tag reader anytime and anywhere. Also, regardless of a place where a user stands, such as indoors or outdoors, or on a basement floor, it is possible to provide more accurate location information than that provided by a prior location information providing method.

In addition, the user information and location information of the terminal are provided to the location information management server, and thereby various application services may be provided by combining the user information and location information.

More particularly, services related to an NFC settlement system, a traffic card, an electronic door lock, cash advance, and others may be provided by utilizing the method above. Also, location information at various places such as a public institution, a shopping mall, a department store, a bank, a subway station, a bus, an entrance, and others may be provided, and accurate location information may be provided regardless of locations at which a tag reader is installed.

Also, since the tag reader and the NFC tag of the terminal may communicate with each other within a close range (e.g., 10 cm), the terminal may be provided with a more accurate location information value from the tag reader compared with using a communication method having a wider communication range. Accordingly, when providing location information, the possibility of malfunction or misrecognition may be reduced.

In addition, bi-directional communication between the NFC tag of the terminal and the tag reader is possible. That is, compared with a prior RFID wireless communication method that is only capable of one way reading, the tag reader can transmit a location information value to the NFC tag of the terminal and the NFC tag can transmit user information of the terminal to the tag reader based on the bi-directional communication, and thereby the tag reader and the NFC tag can exchange information through the bi-directional communication. Therefore, it is possible to easily read and write the location information value between the terminal and the tag reader. Further, the terminal can be directly provided with location information from the tag reader regardless of a server for managing location information.

Also, user information of the terminal regardless of the information (e.g., personal information related to a personal micro-payment, shopping, and personal authentication, which cannot be provided from the terminal) may be provided to the location information management server through the tag reader. The location information management server may combine the user information of the terminal and the location information of the tag reader to provide various application services to a user.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for obtaining and processing location information, the method comprising:
communication between a terminal including a near field communication (NFC) tag and a tag reader in an environment in which tag readers are installed at a plurality of locations;
the tag reader being provided with user information from the NFC tag of the terminal;
the tag reader providing to the NFC tag of the terminal stored location information corresponding to the location of the tag reader; and
the tag reader providing the user information and the location information to a location information management server.

2. The method of claim 1, further comprising:
the location information management server receiving the user information and the location information from the tag reader and storing and managing them; and
the location information management server providing an application service based on the user information and the location information.

3. The method of claim 2, further comprising:
the location information management server receiving user information from the terminal; and the location information management server obtaining location information corresponding to the user information received from the terminal,
wherein, in the location information management server providing an application service, the location information management server provides an application service based on the obtained location information to the terminal.

4. The method of claim 2, further comprising:
the location information management server receiving a data request signal including user information from the terminal;
the location information management server obtaining location information corresponding to the user information included in the data request signal from the stored and managed information; and
the location information management server transmitting the obtained location information and response data to the terminal.

5. The method of claim 4, further comprising:
the terminal receiving the response data and the location information from the location information management server;
the terminal executing an application unit according to the response data; and
the terminal being provided with an application-related service data from the location information management server through the executed application unit.

6. The method of claim 1, further comprising:
the NFC tag of the terminal providing the user information to the tag reader;
the NFC tag of the terminal receiving the location information from the tag reader; and
the NFC tag of the terminal storing the received location information in the terminal for use by the terminal as its location.

7. A tag reader, comprising:
a first communication unit configured to transmit/receive to/from a near field communication (NFC) tag of a terminal;
a second communication unit configured to transmit/receive to/from a location information management server;
an information storage unit configured to store location information on a location at which the tag reader is installed; and
an information providing unit configured to provide the location information stored in the information storage unit to the NFC tag of the terminal through the first communication unit,
wherein the information providing unit is further configured to provide the user information and the location information provided to the terminal to the location information management server.

8. The tag reader of claim 7, wherein the location information stored in the information storage unit is one among:
information input by a user for managing a place at which the tag reader is installed,
information input through an additional terminal, and
information provided from a server for providing location information.

9. A terminal, comprising:
a near field communication (NFC) tag configured to communicate with a tag reader in an environment in which tag readers are installed at a plurality of locations, to provide user information stored therein to the tag reader, and to receive from the tag reader location information corresponding to the location of the tag reader; and an application unit configured to provide data related to the location information by being executed based on response data provided from a location information management server.

10. The terminal of claim 9, wherein the terminal is further configured to transmit a data request signal including the user information and then receive the response data and location information from the location information management server.

11. The terminal of claim 9, wherein the application unit is further configured to be executed by the response data and then process and output application data based on the location information received from the location information management server.

* * * * *